US009367245B2

(12) United States Patent
Sangapu et al.

(10) Patent No.: US 9,367,245 B2
(45) Date of Patent: Jun. 14, 2016

(54) DATA ACCESS REQUEST MONITORING TO REDUCE SYSTEM RESOURCE USE FOR BACKGROUND OPERATIONS

(71) Applicant: NetApp, Inc., Sunnyvale, CA (US)

(72) Inventors: Satish Sangapu, Frisco, TX (US); Wei Sun, Boulder, CO (US); Keith Moyer, Wichita, KS (US); Charles Binford, Wichita, KS (US)

(73) Assignee: NETAPP, INC., Sunnyvale, CA (US)

( * ) Notice: Subject to any disclaimer, the term of this patent is extended or adjusted under 35 U.S.C. 154(b) by 533 days.

(21) Appl. No.: 13/871,783

(22) Filed: Apr. 26, 2013

(65) Prior Publication Data

US 2014/0325157 A1     Oct. 30, 2014

(51) Int. Cl.
*G06F 12/00* (2006.01)
*G06F 3/06* (2006.01)
*G06F 12/08* (2016.01)
*G06F 11/20* (2006.01)

(52) U.S. Cl.
CPC .............. *G06F 3/061* (2013.01); *G06F 3/0659* (2013.01); *G06F 3/0689* (2013.01); *G06F 11/2071* (2013.01); *G06F 11/2082* (2013.01); *G06F 12/0866* (2013.01); *G06F 12/0875* (2013.01); *G06F 2212/466* (2013.01)

(58) Field of Classification Search
CPC .............................. G06F 3/061; G06F 3/0689
See application file for complete search history.

(56) References Cited

U.S. PATENT DOCUMENTS

| 5,943,689 | A  | * | 8/1999  | Tamer  | G06F 3/0607 |
|           |    |   |         |        | 711/166 |
| 6,983,292 | B1 | * | 1/2006  | Green  | G11B 20/1217 |
| 7,464,243 | B2 | * | 12/2008 | Haridas | G11C 7/20 |
|           |    |   |         |        | 711/159 |
| 2012/0042130 | A1 | * | 2/2012 | Peapell | G06F 12/0866 |
|           |    |   |         |        | 711/126 |
| 2012/0047337 | A1 | * | 2/2012 | Grusy  | G06F 3/0604 |
|           |    |   |         |        | 711/162 |

* cited by examiner

*Primary Examiner* — Reginald Bragdon
*Assistant Examiner* — Hannah A Faye-Joyner
(74) *Attorney, Agent, or Firm* — Haynes and Boone, LLP

(57) ABSTRACT

An I/O processing stack includes a proxy that can provide processing services for access requests to initialized and uninitialized storage regions. For a write request, the proxy stores write information in a write metadata repository. If the write is requested for an address in an initialized storage region of the storage system, the proxy performs a write to the initialized region based on region information in the write I/O access request. If the write is requested for an address in an uninitialized storage region of the storage system, the proxy performs an on-demand initialization of the storage region and then performs a write to the storage region based on region information provided by the proxy.

20 Claims, 9 Drawing Sheets

DATA ACCESS REQUEST MONITORING TO REDUCE SYSTEM RESOURCE USE FOR BACKGROUND OPERATIONS

FIELD

Embodiments described are related generally to data access processing, and embodiments described are more particularly related to a proxy that monitors data access requests with respect to initialized and uninitialized data spaces.

COPYRIGHT NOTICE/PERMISSION

Portions of the disclosure of this patent document can contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2013, NetApp, Inc., All Rights Reserved.

BACKGROUND

Due to ever-increasing disk drive capacities and effective volume sizes of storage systems, some background data storage processes can take a prolonged amount of time, such as days or weeks depending on the configuration of the storage system. The extended amount of time for the background data storage processes can lead to several issues. For example, certain copy operations cannot complete their copy operations because the operations cannot copy beyond the boundary at which the background process is operating. Additionally, certain remote operations cannot complete synchronization operations until the background process is finished operating. Other synchronization operations consume significant amounts of bandwidth, simply to copy empty disk space. Furthermore, some disk volumes may be unavailable to a host computing system until background formatting, reconstruction, and/or rebuild operations complete on the disk volumes. Thus, the disk volumes may be unavailable for extended periods of time. The disk volumes may alternatively be available but running in a degraded state, which can result in lower performance and risk that failure in another drive will cause loss of data.

Companies continue to increase disk drive capacity in storage systems to meet increased demand for storage space. However, the increased disk drive capacity can have a negative impact on system performance as well as network bandwidth usage for background processes. Thus, current tools for storage management do not scale well with the increasing capacity of storage devices and storage partitions.

BRIEF DESCRIPTION OF THE DRAWINGS

The following description includes discussion of figures having illustrations given by way of example of implementations of embodiments described. The drawings should be understood by way of example, and not by way of limitation. As used herein, references to one or more "embodiments" are to be understood as describing a particular feature, structure, or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

Figure 1:
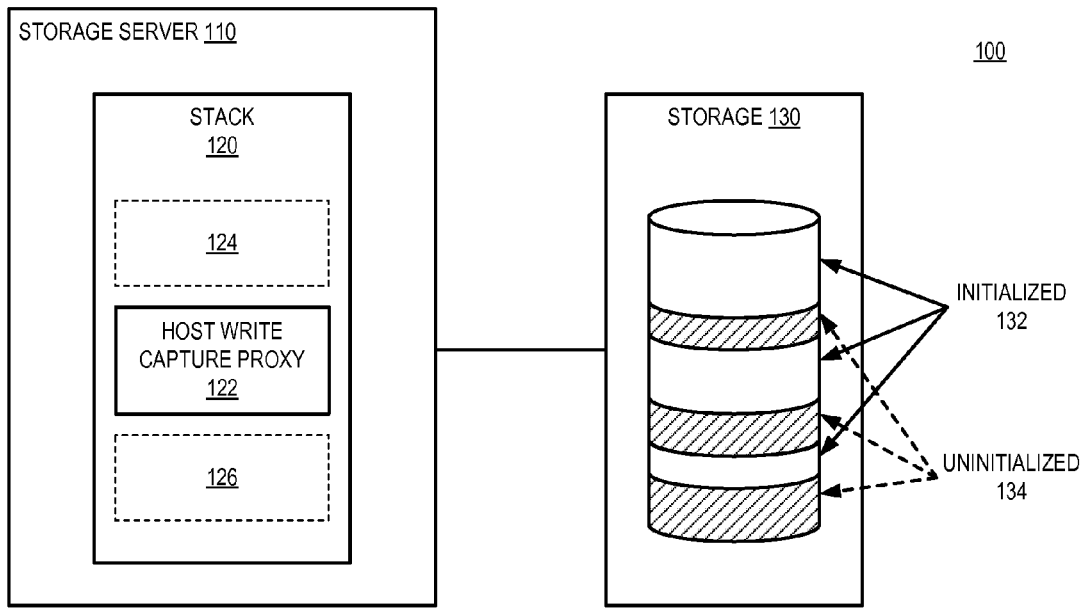
FIG. 1 is a block diagram of an embodiment of a storage system having a host write capture proxy to manage access initialized and uninitialized storage space.

Descriptions of certain details and embodiments follow, including a description of the figures, which can depict some or all of the embodiments described below, as well as discussing other potential embodiments or implementations of the inventive concepts presented herein.

DETAILED DESCRIPTION

An I/O (input/output) processing stack provides processing services for I/O access requests to storage space in a storage system. Storage space includes one more regions of storage blocks or groups of addresses. The I/O access requests can be write requests or read requests. As described below, the I/O processing stack includes a proxy that can provide processing services for I/O access requests to initialized and uninitialized storage regions. The proxy determines whether the request is for an initialized or uninitialized storage region, and determines whether the request is a write request or a read request. A region of storage includes storage resources within a range of addresses. The addresses are commonly virtual addresses within data block access logic, which are mapped to physical addresses of the disks. Data block access logic can include a RAID (redundant array of independent disks or drives) manager or other block-level data manager. An initialized storage region is a region of storage that is registered or otherwise known to data block access logic of the storage system. The data block access logic manages configuration of the storage system, and includes configuration information for initialized storage regions. Thus, an initialized storage region includes address space that can be allocated to store data and be part of virtualized storage structures within the data block access logic. An uninitialized storage region is one for which the data block access logic does not include configuration information. It will be understood that initialization of the storage region writes zeroes to the storage region and ensures that data and parity match, and optionally generates correct protection information (PI) data.

For a write request, the proxy stores write information in a write metadata repository. The write metadata repository includes information such as address information, which can identify the write requests made in the storage system. If the write is requested for an address in an initialized storage region of the storage system, the proxy performs a write to the initialized region based on region information in the write I/O access request. The region information can indicate a range of addresses to which the data is to be stored. If the write is requested for an address in an uninitialized storage region of the storage system, the proxy performs an on-demand initialization of the storage region and then performs a write to the storage region based on region information provided by the proxy.

In one embodiment, writes to disk are performed through a write cache. Where a write cache is used, the system can delay on-demand initialization. For example, if the host write fully covers an uninitialized region, the entire region will be fully initialized when the cache flushes to disk, and will include data for the entire region. If the host write does not fully cover the entire uninitialized region, the proxy can insert zeroes into the cache in the region associated with the write, to extend or fill out the host write to the full region. Thus, in one embodiment, on-demand initialization includes writing zeroes and guaranteeing parity for a storage region, prior to committing a write to disk. In one embodiment, on-demand initialization of the storage region includes writing zeroes to cache with data for a storage region, which is then flushed to disk (e.g., flushed in accordance with rules governing the cache device).

In one embodiment, the first instance of a write to a storage region can be simply written to cache, filling out the remainder of the storage region with zeroes. Subsequent writes to the same storage region can be written to the cache by overwriting the zeroes. Such subsequent writes can be treated the same as writing to initialized storage space. Multiple host writes can be concatenated together to guarantee a full stripe write to the storage region. The full stripe write would ensure parity consistency for that stripe on disk. Similar techniques could be used with protection information (PI), by directing a driver to insert zeroes together with the PI. Thus, in one embodiment, the proxy waits until a cache flush to perform on-demand initialization. Thus, the proxy can delay on-demand initialization to potentially reduce what needs to be initialized due to actual data being written to the storage region.

In one embodiment, for a read request, as with a write request, the proxy performs different operations based on whether the address of the read I/O access request corresponds to an initialized storage region of the storage system or an uninitialized storage region. If the read is requested for an address in an initialized storage region of the storage system, the proxy can perform a read of the initialized storage region in accordance with the read I/O access request. If the read is requested for an address in an uninitialized storage region of the storage system, the proxy can return a zero from the proxy layer without accessing the uninitialized storage region. The system can subsequently initialize the storage region of the read I/O access request. Thus, the proxy can return zeroed data to simulate an initialized block storage extent before or in place of performing the initialization with a background process.

It will be understood that some background data storage processes take a long time to complete relative to the desire for availability of data within a storage system. When background processes operate, the storage regions on which they perform operations can be identified as uninitialized in the storage system. The proxy as described can allow I/O access requests to initialized regions of the storage system to be performed in accordance with the specific request, while also allowing the system to handle requests to uninitialized storage regions. Thus, the background processes can operate, and the storage system can serve data prior to waiting for the background process to complete. For example, remote copy operations can be allowed to complete synchronization via the proxy and subsequently be committed to the system. Similarly, the proxy can enable I/O access operations for disk volumes that would otherwise be unavailable to a host computing system due to background formatting, reconstruction, and/or rebuild operations.

In one embodiment, the proxy provides a mechanism to track host write logical block addresses (LBAs) for a given volume. Tracking the host write LBAs is referred to below as "host write capture." In one embodiment, data block access logic includes a layered I/O processing stack; thus, such a system can implement the proxy for host write capture within existing layered volume proxy mechanisms to intercept host writes as they are issued from the I/O host. In one embodiment, once intercepted, the proxy can persist LBA information to a locally managed storage space for addresses affected by the host write of the write access request. In one embodiment, the system can utilize the persisted LBA information in post-fault situations, such as a subsystem power reset. The system can utilize the LBA information to eliminate write zeroes and background parity generation (e.g., an immediate availability format (IAF)) as well as significantly reduce data movement and system resources for the following various functionalities. Among the functionalities in which the system can reduce data movement via the proxy include: reconstruction, copy back, reconfiguration, synchronous remote volume mirroring (RVM), asynchronous remote volume mirroring (ARVM), volume copy, disaster recovery (DR) to the cloud, de-duplication, and compression. By using the metadata, the system can determine what blocks have been written and only copy the data written by the host and not copy storage areas that contain no host-written data.

It will be understood that the proxy has an impact on performance due to recording write information. In one embodiment, the proxy is configurable to be selectively enabled and disabled. Thus, if a system user is concerned about the performance degradation due to the host write capture proxy, the user can disable the proxy or configure the proxy to disable itself from the I/O processing stack after initialization of the volume. In one embodiment, each disk volume includes a separate proxy.

FIG. 1 is a block diagram of an embodiment of a storage system having a host write capture proxy to manage access initialized and uninitialized storage space. System 100 represents a storage system, which includes storage server 110 and storage 130. Storage server 110 includes I/O processing stack 120. Stack 120 includes proxy 122 to provide host write capture features. Proxy 122 can be one of multiple layers of stack 120. Each stack layer is one or more logic modules executing in storage server 110. Stack 120 can include one or more layers 124 prior to proxy 122 and/or one or more layers 126 after proxy 122, referring to an order in which layers in the stack execute.

Proxy 122 implements host write capture by storing host write information in a metadata repository or a metadata volume. In one embodiment, proxy 122 implements host write capture using a modification of copy-on-write technology present in data block access logic of storage server 110.

For example, existing copy-on-write technology of a system can be modified to provide a more generic operation-on-write, where the existing technology provides the trigger for the operation. The operation, instead of a copy operation, is a host write information capture operation, storing write request information to be persisted. Thus, no copy-on-write activity would be performed, and a host capture operation(s) would be performed. Stack 120 can include a copy-on-write mechanism, such as a layer of the stack not specifically shown. In one embodiment, the copy-on-write mechanism is a process or module invoked by a layer of stack 120. The copy-on-write mechanism includes logic to determine when a write is requested, and logic to trigger an operation in response to detecting the write request. It will be understood that technology other than copy-on-write can be used to detect host writes and capture host write metadata. For example, the data block access logic can include or function with write metadata logic that creates a bitmap of host writes. With subsequent reference to metadata, it will be understood that such metadata can include bitmap metadata, copy-on-write metadata, data in a shadow directory, data in a delta log, or other metadata to track write information.

Storage 130 includes initialized storage space or storage region(s) 132, as well as uninitialized storage space or storage region(s) 134. Storage 130 can include uninitialized storage space interleaved with initialized storage space. It will be understood that typically a background process operates on contiguous storage blocks or blocks with adjacent addresses. However, with proxy 122, some storage regions can be initialized prior to operation by a background process. While the diagrammatic representation may not be entirely real-world plausible, it will be understood that initialized and uninitialized storage space can coexist on the same disk and/or volume (across multiple disks). In one embodiment, proxy 122 operates with the following behavior. Proxy 122 directly writes to the original volume for host writes to regions of initialized storage 132. Proxy 122 directly reads to the original volume for host reads to regions of initialized storage 132. In such circumstances, proxy 122 can detect that the region is initialized (e.g., via access to a metadata repository). Proxy 122 initiates an on-demand initialization in response to a host write to a region of uninitialized storage 134. Proxy 122 writes to the original volume with region data not included in the host write, and filled in with zeroes.

In one embodiment, proxy 122 writes metadata to the repository (instead of volume data) to indicate that the initialization was performed. In one embodiment, proxy 122 returns zeroed data in response to a read request to a region of uninitialized storage 134. In one embodiment, where proxy 122 implements host write capture via a modified copy-on-write mechanism, a background initialization process can query a copy-on-write repository to determine which volume region(s) have copy-on-write metadata present. Generally, the background initialization process can query the metadata repository for whatever host write capture mechanism is used to determine which volume region(s) have metadata present. When an initialization process of the storage system performs background initialization, any volume extents without metadata present can be identified as needing initialization (either parity consistency or write-zeroes initialization). A background initialization process can proceed through all volume blocks, formatting regions with no metadata present in the repository. The background process can skip the regions with metadata, because they will have already been initialized on-demand. Thus, when the initialization process completes, the volume will be fully formatted and the proxy mechanism can be removed or disabled.

In one embodiment, system 100 defers background initialization of regions not yet written until an arbitrary time after creation. Based on the background initialization behavior described above, regions that do not have metadata present are regions that have received host writes. In one embodiment, a reconstruction process or other process can utilize the relationship between the presence or lack of metadata to perform optimizations in the operation of the process(es). Thus, where host write capture data exists for a data block, the background process can forego processing the data block.

In one embodiment, storage 130 includes multiple separate volumes. A storage volume is a logical structure of physical storage space to be managed by data block access logic as a single unit. Physical storage space allocated to each volume can be separated across physical devices. In one embodiment, the data block access logic associates a logical block address (LBA) or comparable identifier for each block in a volume, and uses the logical addresses to access the storage space. In one embodiment, proxy 122 is associated with a single volume. Thus, each volume within storage 130 can be associated with a separate proxy 122. Proxy 122 can be selectively activated for a volume.

In one embodiment, a user can configure the behavior of proxy 122 for each volume or other logical structure associated with the proxy. For example, host write capture can be enabled long term, and be available for as long as an associated volume exists within system 100. In such an implementation, mechanisms such as background parity generation or write zero operation are not required for the volume, seeing that the host write capture can provide access management for uninitialized storage space. In one embodiment, a user can enable host write capture with proxy 122 for a volume, and later disable host write capture at some point after creation of the volume. For example, system 100 can initiate a background parity generation or background write zero process, and once the process has completed its background task, system 100 can disable proxy 122.

In one embodiment, a user can configure system 100 to disable proxy 122 after a background process has reached a threshold point of execution. In the example above, the threshold point could be considered one hundred percent completion. In one embodiment, the system can initially have only proxy 122 enabled without any background initialization process executing. After a threshold amount of initialization with proxy 122, the system can start an initialization process to complete the initialization. Thus, the system will complete initialization by performing some initialization with proxy 122 and the remainder with a background process.

In one embodiment, system 100 initiates proxy 122 to execute in parallel to certain background operations. For example, system 100 can initiate proxy 122 just prior to performing a format of a volume. Thus, as the format process executes in the background, access to the volume is managed by proxy 122. The effect is that a user would observe a format that appears to complete immediately after starting. Proxy 122 would cause a small performance impact while performing host write capture to manage access to the volume while the actual format completes in the background. System 100 can disable proxy 122 as soon as the format process completes, which would remove the performance impact as soon as possible. Other examples of selectively enabling and disabling proxy 122 will be understood to those skilled in the art.

In one embodiment, proxy 122 manages I/O access requests to storage. Managing the I/O access requests includes allowing the processing stack to process requests to initialized regions of storage without any change. Proxy 122 can access a mapping or table or other mechanism that indicates which storage regions are initialized, and which are uninitialized. Managing the I/O access requests to uninitialized regions of storage includes determining whether the request is for a write or read. In one embodiment, proxy 122 handles write requests as discussed above. In one embodiment, proxy 122 handles read requests to uninitialized storage space by returning zeroes or zeroed data for the block(s) identified in the request, without even accessing the storage device.

Consider a use-case of system 100, in an embodiment where system 100 provides an immediately available write-zeroes format. In one embodiment, when an application creates a volume, system 100 instantiates proxy 122 for the volume. Instantiating proxy 122 or other instantiation refers to creating an instance or a copy of a source object or source code. The source code can be a class, model, or template, and the instance is a copy that includes at least some overlap of a set of attributes, which can have different configuration or settings than the source. Additionally, modification of an instance can occur independent of modification of the source. The generated instance of proxy 122 may or may not be visible to a user.

When the volume is created, it will be uninitialized until a background initialization process completes. While the contents of the created volume are uninitialized, host access to the volume can immediately appear as if all data blocks were pre-initialized to zeroes, via management by proxy 122. In one embodiment, proxy 122 stores data in a host write capture repository (see the description of FIG. 2 below) that is controlled by the proxy, reducing the I/O performance impact and reducing the use of available storage space.

In one embodiment, system 100 automatically starts a background initialization process to initialize the volume data. Hosts utilizing the volume are largely unaffected by the operation of the background initialization process. However, the initialization results in additional drive activity that could impact the maximum throughput for the host. In one embodiment, a user can affect the rate of initialization by tuning a priority attribute of the background initialization process.

In one embodiment, even after completion of the background initialization process, system 100 leaves the host write capture framework in place, including proxy 122. The overhead for host write capture is reduced when the background process completes initialization of a volume. When the entire volume has been initialized, there is no need for proxy 122 to perform on-demand initialization in conjunction with a write access, which can improve the latency on subsequent writes to new locations. Additionally, when the entire volume has been initialized, proxy 122 does not need to perform metadata lookup on reads, because the entire volume is either initialized with zeroes and proper parity, or contains host-written data. By leaving proxy 122 in place to continue to track host writes after initialization of the volume, proxy 122 continues to generate write metadata, which can be useful in reducing the load of certain background operations (e.g., copy/reconstruct) by identifying which blocks of data are host-written, and which do not need to be moved.

In one embodiment, once the background initialization process is complete, system 100 removes the host write capture framework, which includes proxy 122. After initialization, the volume data agrees with the initialized data presented by proxy 122. Thus, removing proxy 122 does not result in a change to volume data for the requesting applications. However, removing proxy 122 eliminates the performance and storage overhead incurred during initialization.

Figure 2:
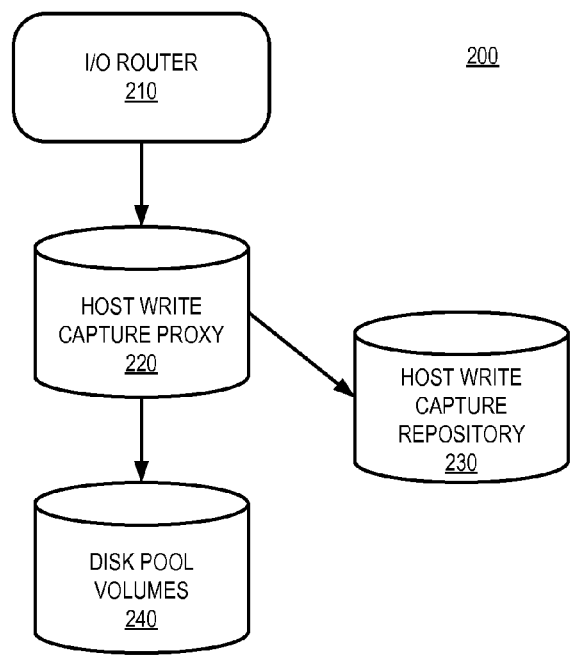
FIG. 2 is a block diagram of an embodiment of an I/O processing stack including a host write capture proxy.

FIG. 2 is a block diagram of an embodiment of an I/O processing stack including a host write capture proxy. Stack 200 provides processing services for I/O access requests to storage in storage system. Stack 200 provides one example of an embodiment of stack 120 of system 100. Stack 200 receives host I/O requests at I/O router 210. I/O router 210 is a logic module that identifies a volume associated with the I/O request. I/O router 210 generally routes the I/O request to a standard or a dynamic disk pool volume to perform the read or write operation of the I/O request.

In one embodiment, stack 200 includes host write capture proxy 220 to receive an I/O request from I/O router 210 and determines if it is a write I/O request. If the request is a write request, host write capture proxy 220 captures the host write information (metadata only without user data) in host write capture repository 230. In one embodiment, host write capture proxy 220 captures only request metadata as the host write information, without capturing the user data.

For write requests, host write capture proxy 220 routes the I/O request to the standard or dynamic disk pool volume 240 to perform the write operations. In one embodiment, for read requests, host write capture proxy 220 may or may not route the I/O request to disk pool volume 240. Host write capture proxy 220 can provide zeroed data in response to a read I/O request for uninitialized storage regions. Disk pool volume 240 performs appropriate parity calculations for the first write to a given set of LBAs to keep consistency for both data and parity.

It will be understood that in typical storage systems, the only access allowed directly to the original volume is in regions that have been previously initialized. Allowing direct access to only initialized blocks isolates the host from possible parity errors or unformatted blocks. Host write capture proxy 220 allows indirect access to other blocks. In one embodiment, host write capture proxy 220 stores metadata without volume data in host write capture repository 230.

Host write capture repository 230 can be implemented in a number of ways. In one embodiment, host write capture repository 230 includes a shadow directory. In one embodiment, host write capture repository 230 includes multi-level delta log. In one embodiment, host write capture repository 230 is a standard volume or DDP (dynamic disk pool) volume, depending on the type of volume for which host write capture proxy 220 is enabled. In one embodiment, a storage system in which stack 200 is included implements one repository per RAID group. One RAID group can contain multiple volumes. In one embodiment, a storage system in which stack 200 is included includes one repository volume for every volume with a proxy 220 enabled, which allows simple management of repository space to implement host write capture.

In one embodiment, host write capture repository 230 is implemented as reserved space at the end of each volume, rather than as a separate logic entity (e.g., a separate volume). In one embodiment, a storage system in which stack 200 is included can include a limited number of total repository volumes (e.g., four repository volumes: 2 DDP and 2 standard volumes), which then requires additional logic to determine how the repositories are allocated and/or maintained for the volumes.

In one embodiment, in a limited volume implementation, a certain number of volumes can be allocated for a first controller, and another number of volumes allocated for a second controller (e.g., one managed repository volume for controller A, and one managed repository volume for controller B). The management logic can include logic to determine how to copy data extents pertaining to transferred volumes when ownership transfers occur. For example, the data extents pertaining to the transferred volume can to be copied to a peer repository volume on an alternate controller.

In one embodiment, host write capture proxy 220 tracks writes via existing mechanisms in stack 200. For example, host write capture proxy 220 can include shadow directories and/or multi-level delta logs to capture affected LBA ranges. In one embodiment, host write capture proxy 220 tracks certain host writes with one mechanism, and other host writes with a different mechanism. The difference in mechanism used can be determined, for example, by the type of use-case scenario or the background process that will be operating. In one embodiment, host write capture proxy 220 utilizes a multi-level delta log for RVM and ARVM features.

Consider that stack 200 is part of a system (such as system 100) that implements background parity generation. Background parity generation can take a prolonged amount of time due to ever-increasing disk drive capacities of modern systems and in-effect volume sizes (perhaps days/weeks depending on the configuration). A volume copy cannot copy beyond a boundary at which the background parity generation is operating. Thus, in the described implementation, it is common that a volume copy cannot finish the copy operation until the background parity generation completes. Similarly, legacy RVM and ARVM operations cannot finish synchronizing to the remote system until the background parity generation is complete. Fundamentally, performance for a given volume is affected when the background parity generation is in-progress for that volume. The parity consistency aspect of background parity generation is not always sufficient for a data access to a volume affected by background parity generation. Rather, some situations require performing a full write zeroes format. Thus, the entire affected volume could be completely unavailable to the host until the format completes. In one embodiment, the proxy provides full write-zeroes format for a newly created volume enabling immediate host access.

Additionally, with larger capacity drives, reconstruction and rebuild times continue to increase. A system can employ a host write capture proxy in addition to or as an alternative to the use of dynamic disk pools (DDPs) or a copy back operation that occurs when a failed drive is replaced. A system can deploy a proxy to manage I/O access requests on volume(s) affected by reconstruction and rebuild, which enables the proxy to keep information about write operations. In one embodiment, a reconstruction process only performs reconstruction on LBAs affected by host writes, as indicated by the information maintained by the proxy, which can greatly reduce reconstruction time.

With larger capacity volumes, a traditional volume copy operation can take a long time. Given that a user cannot access the destination volume until the volume copy operations are complete, the amount of time may be an unreasonable amount of time from a user perspective. Similarly, synchronization of content for RVM and ARVM can take an excessive amount of time with large capacity volumes. Furthermore, the synchronization scenario also depends on the bandwidth of the link between the source and destination systems and the effective load on both systems. When a system employs a host write capture proxy, volume copy, RVM synchronization, and ARVM synchronization can start and complete without depending on background parity generation. Additionally, volume copy, RVM, ARVM, and cloud-based services can synchronize or copy only blocks affected by host writes, and not move unwritten data, uninitialized data, or stale data over a link to perform synchronization or copy. Operating only on the affected blocks can greatly reduce the synchronization or copy time.

Additionally, when adding storage capacity to an existing ARVM-mirrored volume, the newly available capacity is traditionally synchronized to the secondary array. However, the data in the newly available capacity is necessarily not data written by the host, seeing that the new capacity had not yet been available to the host. Thus, synchronization of new capacity utilizes bandwidth for little to no user benefit. By using host write capture proxy 220, and only synchronizing blocks indicated in repository 230, expanding an ARVM-mirrored volume does not result in extra synchronization bandwidth. Rather, each endpoint can simultaneously format the new capacity while still allowing host writes to the new region.

As discussed above, proxy 220 and proxy 122 provide I/O processing proxying and host write capture services. The host write capture services can reduce the amount of time data blocks are unavailable due to background processes. In addition to reducing the amount of time the host system must wait before the data blocks are accessible, the host write capture services can reduce I/O bandwidth use, compute cycles, memory usage, and load on storage resources.

Figure 3:
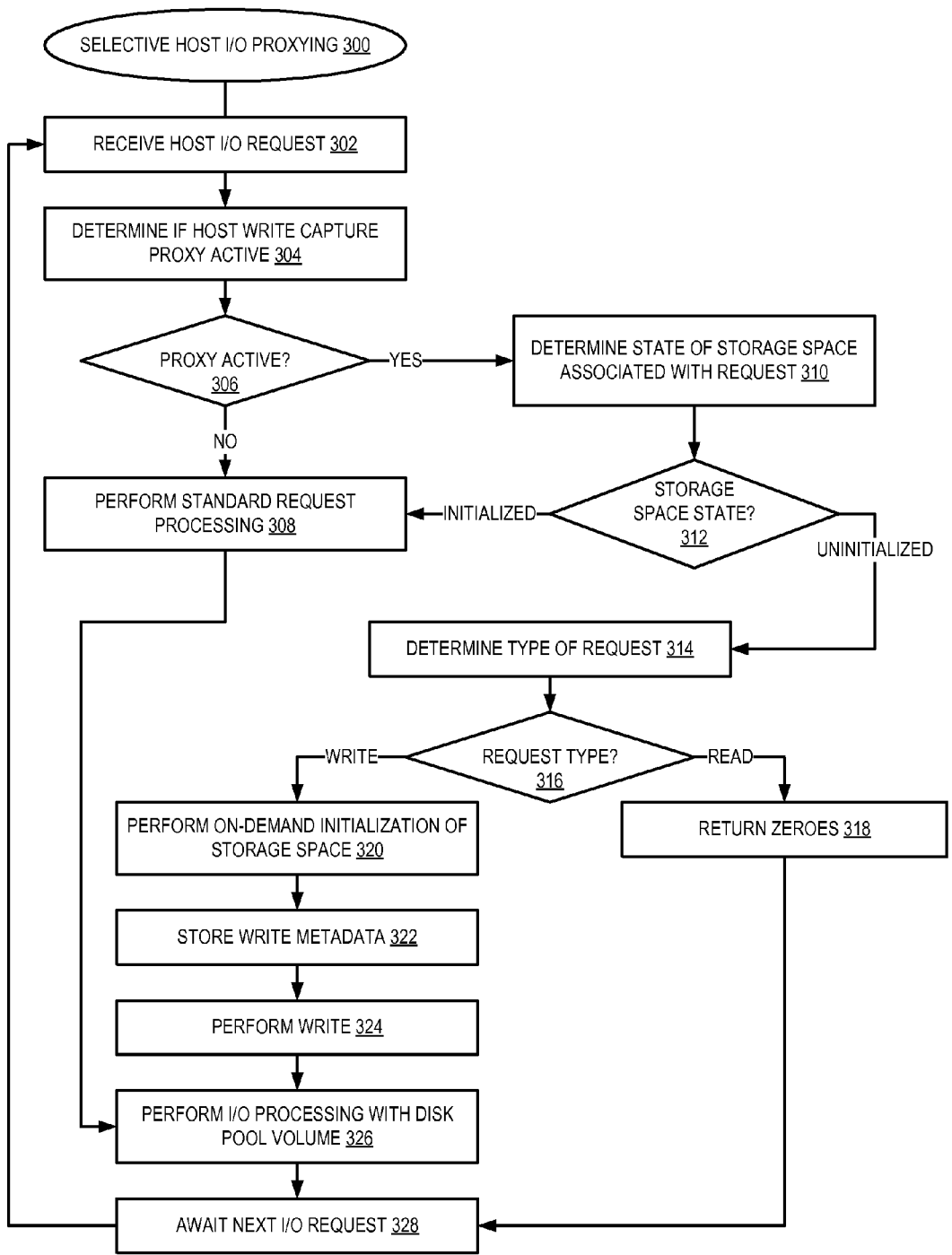
FIG. 3 is a flow diagram of an embodiment of a process for selectively processing I/O requests with a host write capture proxy.

FIG. 3 is a flow diagram of an embodiment of process 300 for selectively processing I/O requests with a host write capture proxy. A host, such as an application executing as a client of a storage system, generates an I/O access request. The I/O access request is a read or a write to data in storage resources of the storage system. The host sends the requests to the host operating system, which processes the request with an I/O processing stack. The I/O processing stack receives the host I/O request, block 302. In one embodiment, the I/O processing stack includes a host write capture proxy, and it determines whether the host write capture proxy is active, block 304.

If the host write capture proxy is not active, block 306 NO branch, the I/O processing stack performs standard I/O request processing, block 308. Standard processing is described in more detail below. If the host write capture proxy is active, block 306 YES branch, the I/O processing stack passes the I/O request to the proxy which determines the state of the storage space associated with the request, block 310. The I/O request includes address information identifying the data block(s) to which the access request is directed. In one embodiment, the proxy accesses a log or a map that indicates the state of the different address ranges of the storage resources.

If the state of the storage space is initialized, block 312, the proxy routes the I/O request back to the stack to perform standard request processing, block 308. In one embodiment, if the state of the storage space is uninitialized, block 312, the proxy determines a type of the request, block 314. The storage space is uninitialized if a background parity generation process has not completed. If the request type is a read request, block 316, in one embodiment, the proxy returns zeroes without accessing the storage resources, block 318. If the request type is a write request, block 316, performs an on-demand initialization of the storage space associated with the request, block 320. The proxy stores write metadata in a repository managed by the proxy, block 322. The proxy performs the write in accordance with information provided by the proxy, block 324.

As mentioned above, the use of a proxy can make a format command appear to complete almost immediately, from the perspective of an end-user, because the proxy can manage access to uninitialized regions while a background process completes initialization. In addition, when a user formats a volume after the volume has been used (and a background initialization may have already completed for the volume), the format can appear to take place very quickly to the user. In the case of formatting a volume, in one embodiment, the system need only clear the metadata, and set it back to the state it was in when the volume was initially created. It will be understood that the amount of metadata is relatively small compared to the size of the volume, and thus the format process can appear to be almost instantaneous (e.g., on the order of seconds, versus hours to actually format the volume). A proxy can be executed for the "formatted" volume, and similar processes executed as described above.

In one embodiment, the proxy monitors progress of the background process. Assume that the background process operates sequentially through the address space of the volume. When the proxy receives a new I/O request, it can determine if the address of the I/O request is outside a current boundary of the background process operation. If the I/O request is outside the already initialized storage space, the proxy performs on-demand initialization prior to writing the data. If the I/O request is within the already initialized storage space, the proxy does not need to perform on-demand initialization.

The proxy then routes the request to the disk pool volume(s) to allow the disk pool volume(s) to perform processing on the I/O, 326. The processing by the disk pool volume(s) is for the disk pool volume(s) to access the storage resources and execute the read or write access. It will be understood that for a read to uninitialized storage space handled by the host write capture proxy, the proxy bypasses the disk pool volume(s), as seen in blocks 318 and 328. The system sends requests to initialized storage space to the disk pool volume(s) to fulfill the requests, as seen in blocks 308 and 326. For a write to uninitialized storage space, the proxy initializes the space, and then allows the disk pool volume(s) to fulfill the write request, blocks 320, 322, 324, and 326.

When processing on the received request is complete, the stack awaits the next I/O request, block 328, and processes the next request when it is received as described above, block 302. In the case of a read or write request to initialized storage space, the request itself includes region information that the disk pool volume(s) use to execute the request. In the case of a write to uninitialized storage space, the proxy provides region information after performing on-demand initialization of the storage space. The disk pool volume(s) use the region information provided by the proxy to execute such a write.

In one embodiment, the system of which the host write capture proxy is a part performs a parallel process to determine whether or not to deactivate an active proxy. In one embodiment, the system monitors execution of the background process and/or the proxy and compares the execution of the background process and/or proxy to a threshold level of execution. When initialization of the volume is complete, the proxy can be disabled.

Figure 4A:
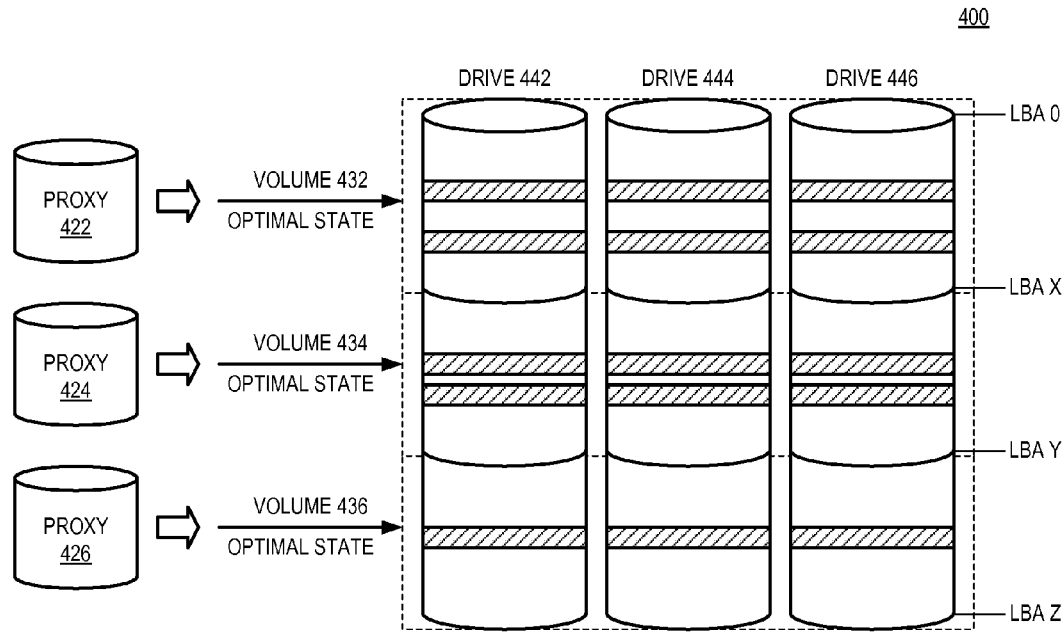
FIGS. 4A-4E are block diagrams of an embodiment of a system that employs a host write capture proxy to perform data reconstruction.

FIGS. 4A-4E are block diagrams of an embodiment of a system that employs a host write capture proxy to perform data reconstruction. System 400 of FIG. 4A illustrates an initial system configuration for a reconstruction use-case example. For purposes of the example, assume that system 400 illustrates a RAID5 (redundant array of independent disks or drives using block-level striping and distributed parity) implementation. System 400 implements RAID5 across drives 442, 444, and 446. Each drive 442, 444, and 446 is shown with address space or LBAs from LBA 0 to LBA Z.

System 400 includes a three-volume group, with volume 432, volume 434, and volume 436. Volume 432 includes address space from LBA 0 to LBA X−1 across drives 442, 444, and 446. Volume 434 includes address space from LBA X to LBA Y−1 across drives 442, 444, and 446. Volume 436 includes address space from LBA Y to LBA Z−1 across drives 442, 444, and 446. It will be understood that the ranges 0-(X−1), X-(Y−1), and Y-(Z−1) are not necessarily equal in size, although two or more of the ranges could be of equal size. The filled rectangles in each drive and volume represent the LBAs that are written by hosts utilizing the three volumes.

Each volume 432, 434, and 436 are initially labeled as being in an optimal state. It will be understood that "optimal" as used in the example does not necessarily refer to an objective optimal state, but rather a functional state or a preferred state based on the operations that have been performed on the volume. In this sense, optimal state can refer to a state in contrast to a degraded state where remedial mechanisms such as rebuilding data based on parity information are used to serve data, instead of simple accesses to serve the data.

As shown, in one embodiment, system 400 includes one host write capture proxy per volume. Proxy 422 corresponds to volume 432, proxy 424 corresponds to volume 434, and proxy 426 corresponds to volume 436. Proxies 422, 424, and 426, respectively, provide host write capture services for volumes 432, 434, and 436.

Figure 4B:
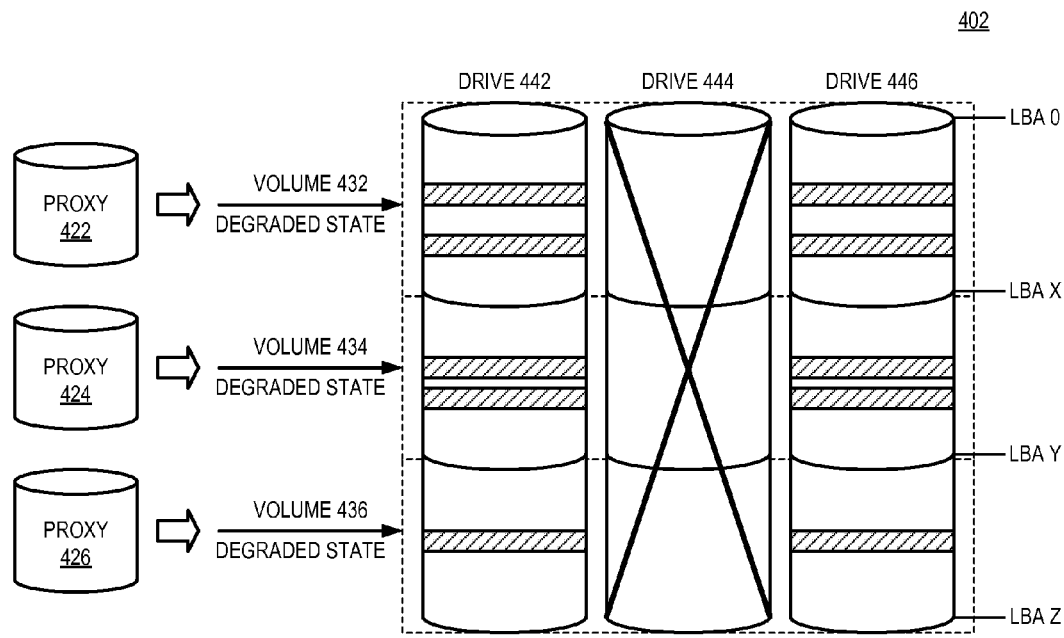

Referring to FIG. 4B, system 402 is a modified version of system 400, or system 400 in a different state. System 402 indicates that drive 444 has failed, which causes the loss of data stored on the drive. As illustrated, volumes 432, 434, and 436 are each now labeled as being in a degraded state.

Figure 4C:
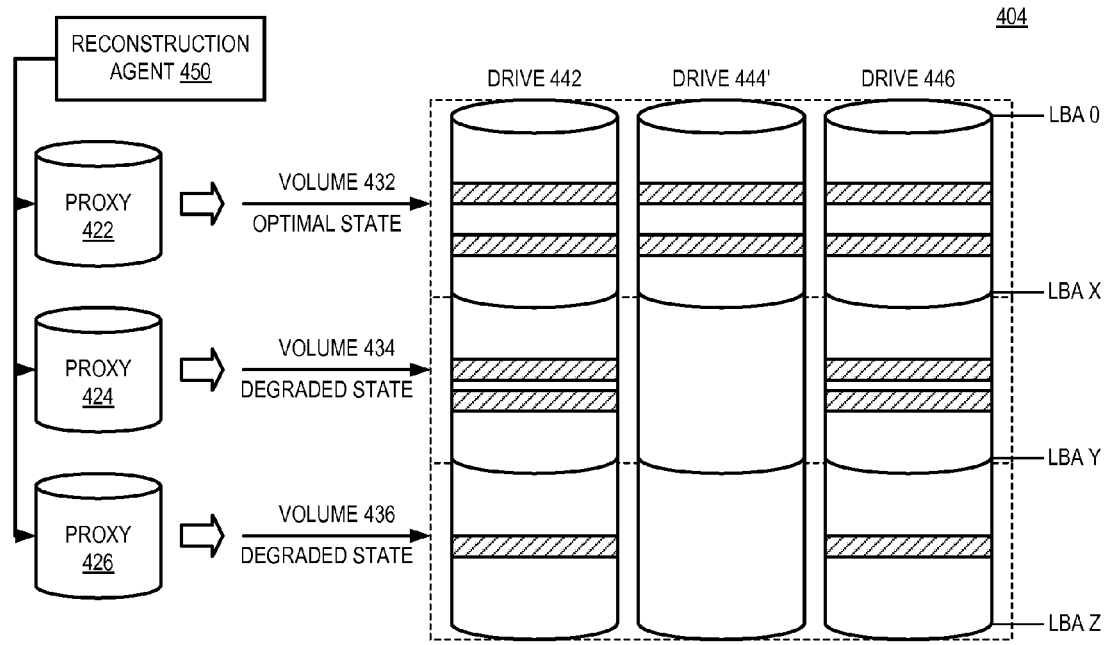

Referring to FIG. 4C, in system 404, drive 444' replaces failed drive 444. Reconstruction agent 450 begins a rebuild or reconstruction of the data on drive 444', and oversees the reconstruction for all three volumes of the volume group. In one embodiment, reconstruction agent 450 utilizes the host write capture information for all three volumes to determine which LBAs to rebuild. For example, instead of performing a rebuild on the entire range of LBA 0 to LBA X−1 for volume 432, reconstruction agent 450 can rebuild only the two shaded ranges in which host writes had been performed. Thus, in one embodiment, reconstruction agent 450 performs reconstruction of volume 432 via proxy 422, to rebuild only the two shaded areas of drive 444'. After rebuilding the two LBA ranges depicted in drive 444', the system transitions volume 432 from a degraded state to the optimal state.

Figure 4D:
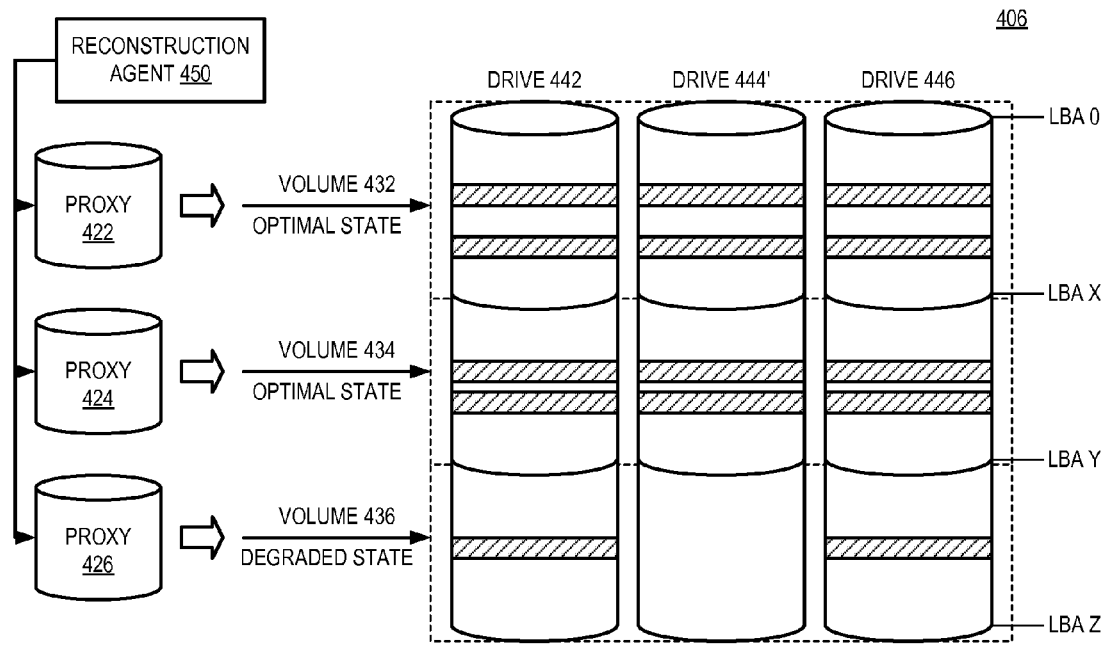
Figure 4E:
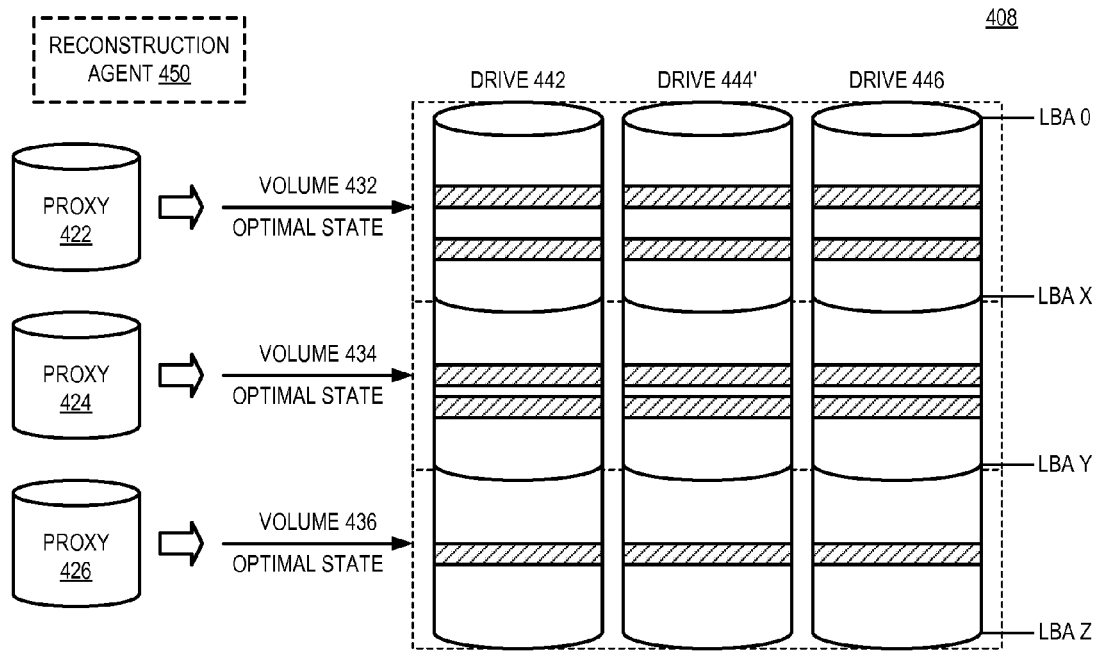

Referring to FIG. 4D, system 406 illustrates how reconstruction agent 450 continues reconstruction by rebuilding the host-written LBA ranges in volume 434 via proxy 424. Once the rebuilding of the host-written ranges is complete in drive 444', the system transitions volume 434 from a degraded state to the optimal state. Referring to FIG. 4E, system 408 illustrates that reconstruction agent 450 rebuilds or reconstructs drive 444' on volume 436 via proxy 426. It will be observed that reconstruction agent 450 is in dashed line in system 408. In one embodiment, system 408 removes reconstruction agent 450 once all volumes in the volume group have been rebuilt. Thus, once drive 444' on volume 436 is rebuilt, the system can remove reconstruction agent 450. Reconstruction agent 450 can be reactivated as needed for subsequent drive reconstruction.

In one embodiment, when the system is configured to perform a background initialization for the volume residing on a drive requiring reconstruction, replacement of a drive (e.g., drive 444') either alters or restarts a drive level initialization. The drive level initialization can be similar to a background volume initialization, but focused only on the drive itself. Assume the following scenario. Background initialization on volume 432 (or any other volume) is complete when drive 444 fails. An administrator replaces drive 444 with drive 444', and the system performs a reconstruction of the data on drive 444'. As described above, in one embodiment, the system only needs to reconstruct the portions of the drive with user data based on metadata stored by proxy 422 (or any proxy associated with a volume of interest). In one embodiment, the system then starts a new background process that initializes the portions of new drive 444' that were not written by the reconstruct process, and only then can the system recognize a background-initialization-complete state for the volume. It will be understood that the new background process only initializes portions of the drive without user data based on metadata stored by proxy 422. For example, if the system uses a bitmap, the reconstruct process can operate based on certain bits indicated in the metadata, and the new background process can operate based on the opposite bits. In one embodiment, if the reconstruct process completes prior to the new background initialization process, the drive may still be entered into full use while the background initialization process is still running. Once completed, the entirety of drive 444' (with respect to volume 432, and the same can be performed in each volume) will be either reconstructed with valid data or initialized. When the volume is not configured for background initialization, the above new initialization may not be performed.

While the example provided illustrates reconstruction, it will be understood that reconfiguration operations would follow similar techniques to what is described above. With a large capacity volume group, reconfiguration operations (e.g., converting a volume's segment size, defragmenting the volume group, increasing a volume's capacity, adding drives to the volume group, changing RAID levels, or other operations) take a prolonged amount of time when performed in accordance with traditional techniques. However, reconstructing and/or reconfiguring based on only host-written LBAs reduces the temporal and computational requirements of the process.

Figure 5:
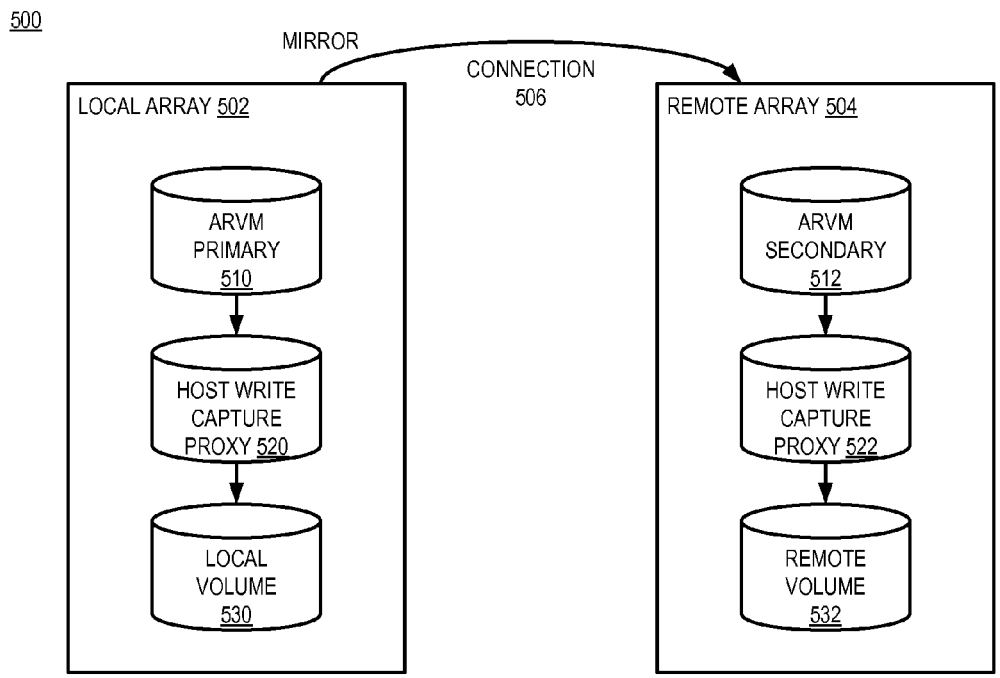
FIG. 5 is a block diagram of an embodiment of a system that employs a host write capture proxy to perform asynchronous remote volume mirroring.

FIG. 5 is a block diagram of an embodiment of a system that employs a host write capture proxy to perform asynchronous remote volume mirroring. System 500 represents local array 502 and remote array 504 of a storage system. Local array 502 and remote array 504 communicate with each other over connection 506, which represents a network connection between the arrays. System 500 illustrates an asynchronous remote volume mirroring use-case where Local array 502 includes local volume 530, which is a volume that is the subject of the asynchronous remote volume mirror (ARVM) between the two arrays. Remote array 504 includes remote volume 532, which is the mirrored volume copy. ARVM primary 510 of local array 502 manages copying data from local volume 530 to remote volume 532 via ARVM secondary 512 of remote array 504. ARVM primary 510 performs the copy over connection 506. ARVM secondary 512 enforces configuration and permissions for remote volume 532. In one embodiment, ARVM primary 510 utilizes host write capture proxy 520 to determine which LBAs on local volume 530 have been written by a host. Based on the determination by host write capture proxy 520, ARVM primary 510 can copy only data to remote volume 532 that was written by a host.

Performing the copying via host write capture proxy 520 can reduce initial synchronization time of the mirroring by hours or even days, as well as saving computation load and network bandwidth over connection 506. In one embodiment, remote array 504 includes host write capture proxy 522 to perform background parity generation/write zeroes independently if a user disables host write capture proxy 520 of local array 502. In one embodiment, after the initial synchronization, ARVM primary 510 uses delta log and/or point-in-time mechanisms to copy only the delta host writes to remote volume 532.

The use-case illustrated can be applied to RVM, volume copy, and disaster recovery to the cloud. The use-case illustrated can also be applied to copyback, reconfiguration (e.g., change RAID type, change RAID layout, or perform another configuration change), or other feature where the system makes a change to user data. With a host write capture framework (including a repository and a proxy), the system can perform the synchronization of data over the network for only data that is host-written, instead of the entire volume. Each side (e.g., local array 502 and remote array 504) can separately initialize their local storage resources.

Figure 6:
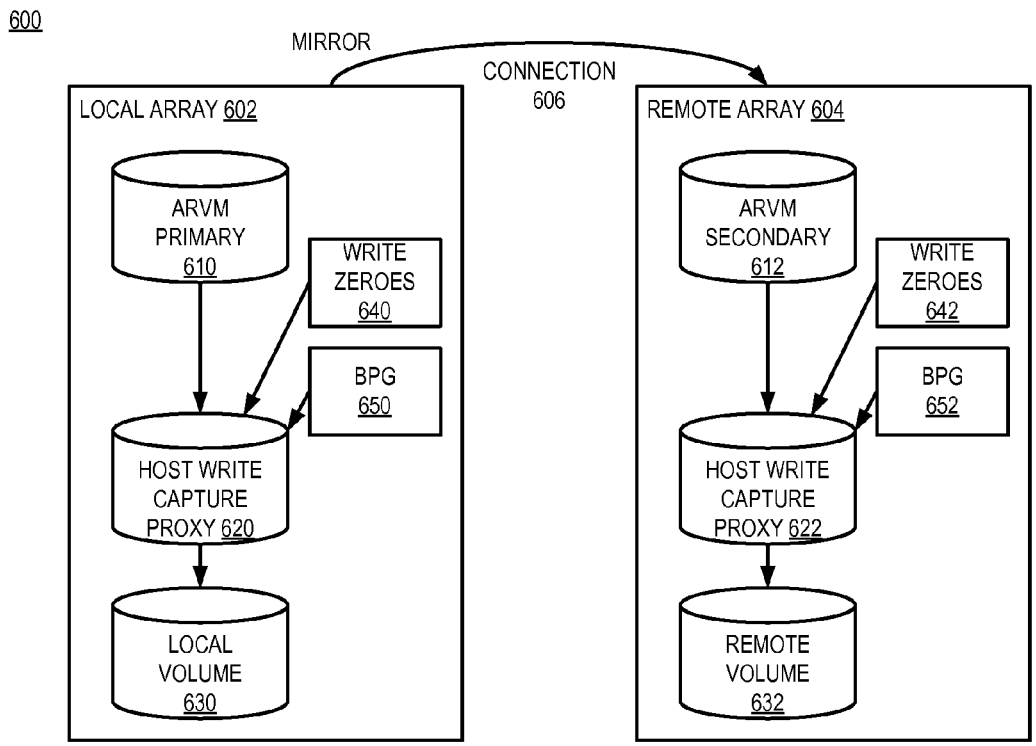
FIG. 6 is a block diagram of an embodiment of a system that employs a host write capture proxy to perform asynchronous remote volume mirroring with subsequent disabling of host write capture.

FIG. 6 is a block diagram of an embodiment of a system that employs a host write capture proxy to perform asynchronous remote volume mirroring with subsequent disabling of host write capture. System 600 illustrates one example use-case of system 500, with the addition of disabling the host write capture mechanism. The user can request a background initialization to start if the process has not already begun, and can also request that the system disable host write capture proxy 620 when the background process is complete. In such a scenario, system 600 can perform write zeroes and/or background parity generation on both the local and remote volume autonomously. Performing write zeroes and/or background parity generation independently on both volumes saves network bandwidth by preventing the copying of needless I/O from local array 602 to remote array 604.

Local array 602 includes ARVM primary 610 to perform the copying, and host write capture proxy 620 to manage I/O access to local volume 630, recording host write metadata information in a repository (not explicitly shown). In one embodiment, local array 602 includes write zeroes logic 640 and/or background parity generation (BPG) logic 650, which operate via host write capture proxy 620. Similarly, remote array 604 includes ARVM secondary 612 to enforce configuration for data copied over connection 606 to remote volume 632. In one embodiment, remote array 604 includes write zeroes logic 642 and/or BPG logic 652, which operate via host write capture proxy 622. Once the copy and configuration operations are finished on both local array 602 and remote array 604, system 600 can disable both host write capture proxy 620 of local array 602 and host write capture proxy 622 of remote array 604.

Figure 7:
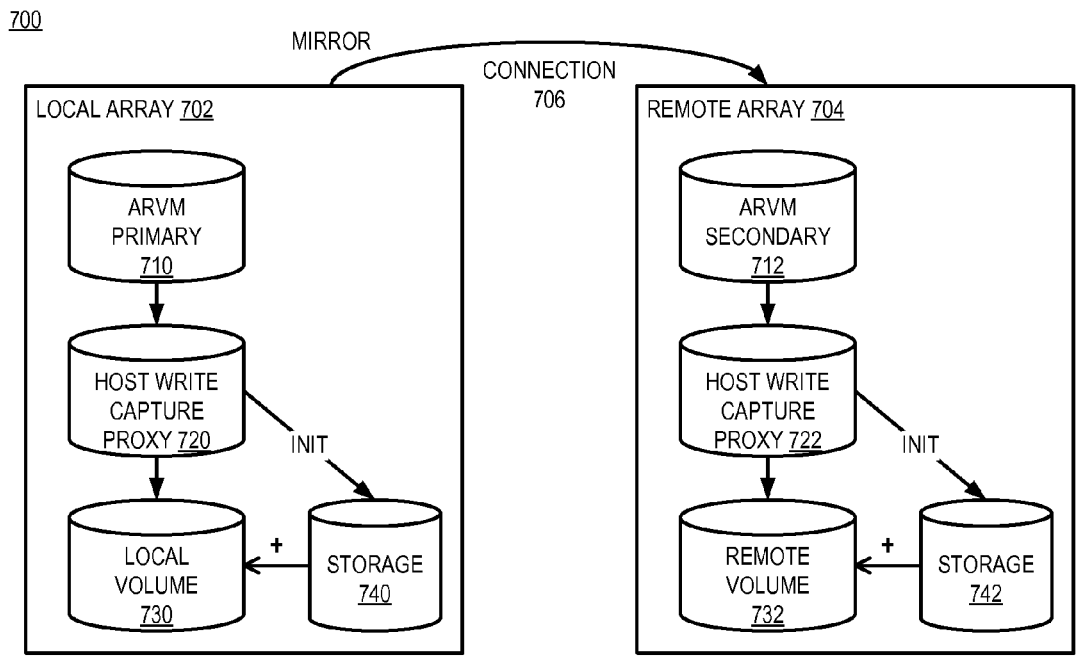
FIG. 7 is a block diagram of an embodiment of a system that employs a host write capture proxy to perform asynchronous remote volume mirroring with new capacity initialization.

FIG. 7 is a block diagram of an embodiment of a system that employs a host write capture proxy to perform asynchronous remote volume mirroring with new capacity initialization. System 700 illustrates one example use-case of system 500, with the addition of managing newly added storage capacity. Local array 702 includes ARVM primary 710 to perform the copying over connection 706 to synchronize remote volume 732 to local volume 730. Local array 702 includes host write capture proxy 720 to manage I/O access to local volume 730, recording host write metadata information in a repository (not explicitly shown). Remote array 704 includes ARVM secondary 712 to enforce configuration for data copied to remote volume 732. In one embodiment, remote array 704 includes host write capture proxy 722 to record host write metadata information.

In one embodiment, both ARVM primary 710 of local array 702 and ARVM secondary 712 of remote array 704 are enabled with a host write capture feature, via host write capture proxy 720 and host write capture proxy 722, respectively. In such an embodiment, new capacity storage 742 added to the mirrored volume (remote volume 742) can simply be included in the write capture information. If proxies 720 and 722 were subsequently disabled, system 700 could initialize new capacity storage 742 and storage 740 along with the original volume extent.

In one embodiment, host write capture proxy 722 of remote array 704 was disabled or was never enabled, and thus was not enabled at the time storage 742 was added to system 700. In such an embodiment, new capacity 742 added to remote volume 732 should be synchronized between ARVM primary 710 and ARVM secondary 712. However, it will be observed that since the host has not previously had write access to the new volume extent of storage 742, system 700 can initialize the data on both ARVM primary 710 and ARVM secondary 712 instead of using mirror bandwidth across connection 706 to transfer the data.

In one embodiment, system 700 detects the addition of new capacity or new storage 742. Upon detecting the new capacity, in one embodiment, system 700 creates host write capture proxies 720 and 722 on ARVM primary 710 and ARVM secondary 712, respectively. System 700 can immediately start background initialization on local volume 730 and remote volume 732, but can limit initialization to the new volume extent. Once the background initialization is complete, system 700 can remove host write capture proxies 720 and 722.

If host write capture proxies 720 and 722 were active, and subsequently disable or removed, ARVM can resume as normal. All writes to mirrored remote volume 732, including writes to new capacity storage 742, will have been tracked by host write capture proxy 722 (e.g., in an ARVM delta log). Thus, the writes to mirrored remote volume 732 will be correctly synchronized over mirroring connection 706. Any regions not written in the new volume extent will have been initialized concurrently on both ARVM primary 710 and ARVM secondary 712. Thus, the entire volume would be properly synchronized.

In one embodiment, an existing ARVM framework utilizes proxy and repository volumes already. Thus, host write capture proxies 720 and 722 can be implemented on the existing proxy and repository volumes instead of needing to create new volumes. In such a case, no additional performance or storage overhead is incurred to perform synchronization in system 700.

Figure 8:
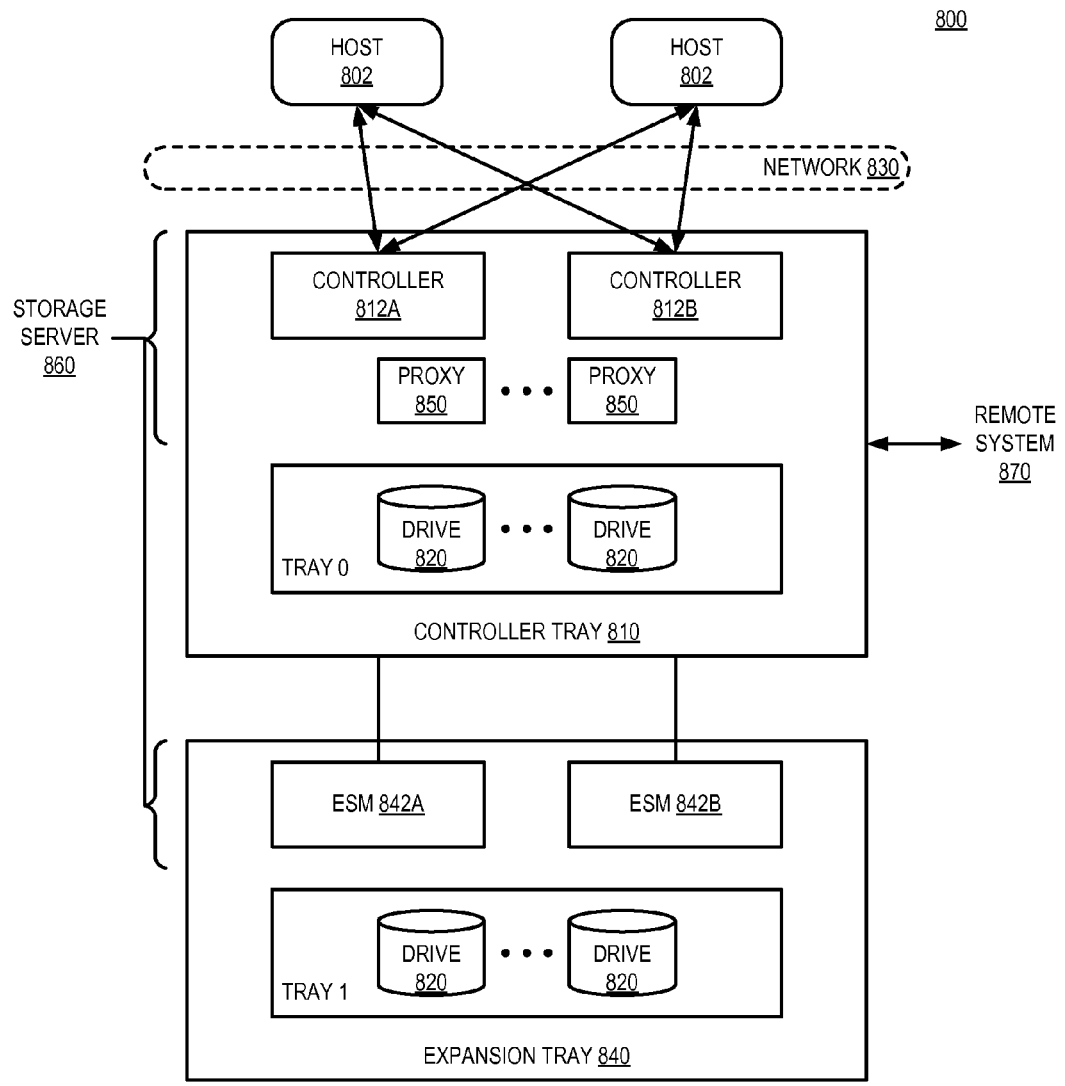
FIG. 8 illustrates a network storage system in which a host write capture framework can be implemented.

FIG. 8 illustrates a network storage system in which a host write capture framework can be implemented. System 800 includes storage servers 810 (storage servers 810A, 810B), which each manage multiple storage units, drives 820 that include mass storage devices. Storage servers 810 provide data storage services to one or more host devices 802 (which could also be referred to as clients) through network 830. Network 830 can include, for example, a storage area network (SAN), a Fibre Channel fabric, serial attached SCSI (SAS) connections, Infiniband connections, a local area network (LAN), wide area network (WAN), metropolitan area network (MAN), and/or global area network such as the Internet to support iSCSI, or any combination of such interconnects. Each of hosts 802 can be, for example, an application or a process that executes on a conventional personal computer (PC), server-class computer, workstation, handheld computing or communication device, or other special or general purpose computer. The host could be considered to include the hardware device.

Storage of data in drives 820 is managed by storage server 860 which receives and responds to various read and write requests from hosts 802, directed to data stored in or to be stored in the storage units. Drives 820 represent mass storage devices which can include, for example, flash memory, magnetic or optical disks, tape drives, or some combination. Drives 820 can further be organized into arrays (not illustrated) implemented as a Redundant Array of Inexpensive Disks/Devices (RAID) or equivalent, in which case storage server 860 accesses drives 820 via one or more RAID protocols as known in the art. Storage server 860 provides block-level service to manage storage in drives 820.

In one embodiment, storage server 860 is referred to as a network storage subsystem. A network storage subsystem provides networked storage services for a specific application or purpose, and can be implemented with a collection of networked resources provided across multiple storage servers and/or storage units. In some embodiments, drives 820 can be considered part of the storage server device. In other embodiments, the storage server is only considered to be the management or I/O control portions as illustrated in system 800. The I/O control portions include controller 812A and controller 812B, proxy 850, and expansion tray control ESM (environmental service monitor) 842.

Controller tray 810 includes one or more controllers 812, and Tray 0 with drives 820. System 800 can include zero or more additional trays of storage devices 820, as illustrated by expansion tray 840. Expansion tray 840 includes one or more ESMs 842, and Tray 1 with drives 820. An ESM includes a module or canister that install in a drive module, and can include a circuit board, temperature sensor, and firmware logic. ESMs 842 manage I/O between drives 820 and the controller or array module, controller tray 810. In one embodiment, ESMs 842 monitor subsystem parameters. ESMs 842 manage access to data in drives 820 of Tray 1. Other ESMs and trays could be added. It will be understood that the representation of the use of different trays ESMs as well as multiple storage servers illustrates the flexibility of a physical implementation of system 800. System 800 could be implemented as simply as a single tray connected to a group of mass storage devices which it manages, and could be more complex with different physical groupings of drives and intermediary management access layers (e.g., the ESMs and trays). Such a system is typically implemented as a single rack or adjacent racks.

Controllers 812A and 812B can actively interface with host devices 802 simultaneously. In the case where multiple controllers 812 are used, each controller can manage access to a separate LUN. The controllers can provide local failover for local connection interruptions. Controllers 812 manage access to all storage controlled by storage server 860, when in Tray 0, Tray 1, or another tray not shown. Interfacing among the trays can be implemented by interconnections and appropriate hardware as well as appropriate modules, processes, and/or other logic layers. Collectively, such functionality can be implemented via one or more protocol stacks, which can include protocol components such as what is described below with respect to FIG. 9, with protocol layers, storage layers, and driver layers to access drives 820. The storage layer can implement a storage protocol (e.g., RAID protocol), and the driver layer can also implement storage device protocols (e.g., Small Computer Systems Interface protocol) for carrying out operations in support of storage access operations.

In system 800, storage server 860 functions as a primary provider of data storage services to hosts 802, but allows for disaster recovery and/or remote replication. As illustrated, Tray 0 can be connected to a remote system 870 to provide disaster recovery and/or remote replication. It will be understood that "remote" refers to a system that includes its own control logic, and can refer to physically separated whether by a short or a great distance. In the case of a remote system 870, data storage requests from hosts 802 are serviced using data stored in drives 820 organized as one or more storage objects. A secondary storage server (not shown) can take a standby role in a mirror relationship with the primary storage server, replicating storage objects from the primary storage server to storage objects managed by the secondary storage. In one embodiment, in operation the secondary storage server does not service requests from hosts 802 until data in the primary storage object becomes inaccessible such as in a disaster with the primary storage server, such event considered a failure at the primary storage server. Upon a failure at the primary storage server, requests from hosts 802 intended for the primary storage object are serviced using replicated data (i.e. the secondary storage object) at the secondary storage server.

It will be understood that system 800 can function with a single storage server, or with more than two storage servers. In one embodiment, protection relationships can be operative between various storage servers in system 800, replicated between any storage servers. Secondary storage objects can further implement protection relationships with other storage objects such that the secondary storage objects are replicated, e.g., to tertiary storage objects, to protect against failures with secondary storage objects. Accordingly, the description of a single-tier protection relationship between primary and secondary storage objects of storage servers will be understood as illustrative only.

In one embodiment, system 800 includes a host write capture proxy framework, including proxy 850 (illustrated as 850A and 850B) within the storage servers. Each storage server 810 can include multiple proxies 850, such as a proxy for each volume or other logical group of storage blocks. Proxy 850 can selectively initialize storage space in conjunction with a request for access to the storage space.

Figure 9:
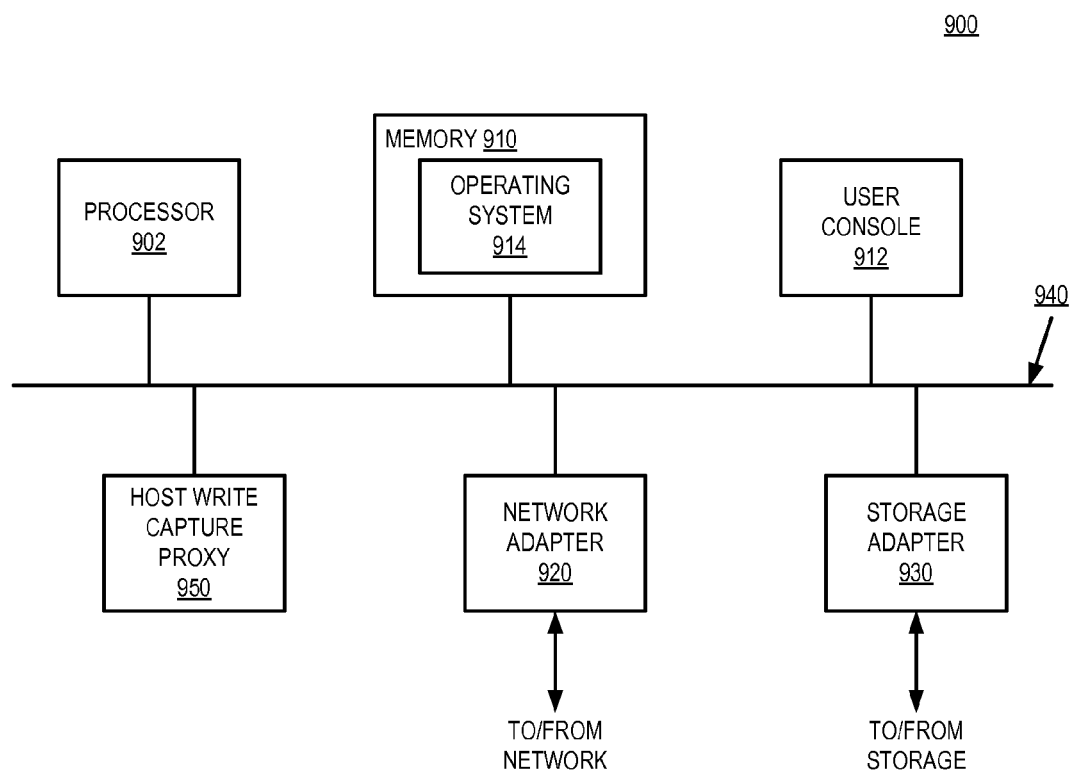
FIG. 9 is a block diagram of an illustrative embodiment of an environment in which a host write capture framework can be implemented.

FIG. 9 is a block diagram of an illustrative embodiment of an environment in which a host write capture framework can be implemented, such as the storage servers 810 of FIG. 8. As illustrated, the storage server is embodied as a general or special purpose computer 900 including processor 902, memory 910, network adapter 920, user console 912, and storage adapter 930 interconnected by system bus 940, such as a convention Peripheral Component Interconnect (PCI) bus.

Memory 910 includes storage locations addressable by processor 902, network adapter 920, and storage adapter 930 for storing processor-executable instructions and data structures. Storage operating system 914, portions of which are typically resident in memory 910 and executed by processor 902, functionally organizes the storage server by invoking operations in support of the storage services provided by the storage server. It will be understood that other processing means can be used for executing instructions and other memory means, including various computer readable media, can be used for storing program instructions to implement the functions and/or operations described herein. It will be understood that some or all of the functionality of the processor 902 and executable software can be implemented by hardware, such as integrated currents configured as programmable logic arrays, ASICs, and the like.

Network adapter 920 includes one or more ports to couple the storage server to one or more management devices, such as monitoring and management equipment. In one embodiment, network adapter 920 couples to clients over point-to-point links or a network. Thus, network adapter 920 includes the mechanical, electrical, and signaling circuitry needed to couple the storage server to management devices and/or to one or more clients or host devices over a network. Each management device or host can communicate with the storage server over the network by exchanging discrete frames or packets of data according to pre-defined protocols, such as TCP/IP.

Storage adapter 930 includes a plurality of ports having input/output (I/O) interface circuitry to couple the storage devices (e.g., disks or drives) to bus 940 over an I/O interconnect arrangement, such as a conventional high-performance, FC or SAS (Serial-Attached SCSI (Small Computer System Interface)) link topology. Additionally, in one embodiment, hosts can connect primarily over FC or SAS connections to the storage server. For example, storage adapter 930 can operate in a SCSI Target mode to interact with a host. Storage adapter 930 typically includes a device controller (not illustrated), including a processor and a memory for controlling the overall operation of the storage units in accordance with read and write commands received from storage operating system 914. Data written by a device controller in response to a write command is referred to as "write data," whereas data read by a device controller responsive to a read command is referred to as "read data."

User console 912 enables an administrator to interface with the storage server to invoke operations and provide inputs to the storage server using a command line interface (CLI) or a graphical user interface (GUI). In one embodiment, user console 912 is implemented using a monitor, keyboard (whether hardware or virtual on a touch surface), and/or pointing device.

In one embodiment, system 900 includes a host write capture proxy framework, including host write capture proxy 950. The host write capture proxy framework is illustrated functionally within system 900, and is typically implemented as layers of software. Host write capture proxy 950 can represent multiple proxies, such as a proxy for each volume or other logical group of storage blocks. Proxy 950 can selectively initialize storage space in conjunction with a request for access to the storage space.

Figure 10:
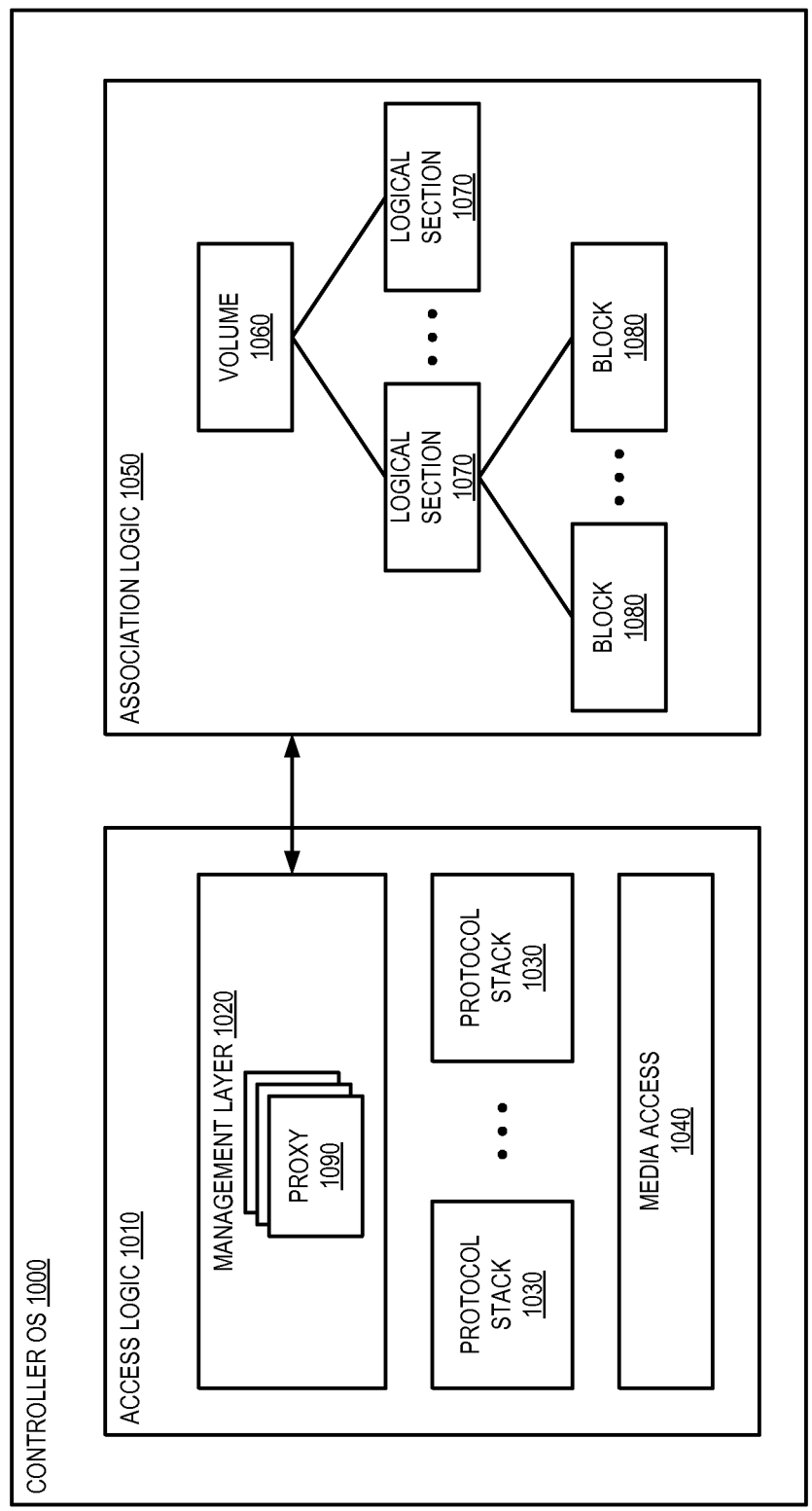
FIG. 10 illustrates an embodiment of a storage operating system in which a host write capture framework can be implemented.

FIG. 10 illustrates an embodiment of a storage operating system, such as storage operating system 914 of FIG. 9, in which a host write capture framework can be implemented. Storage operating system or controller operating system 1000 includes a series of software layers executed by a processor, such as processor 902 of FIG. 9, and is organized to implement access logic 1010 and association logic 1050 to provide data paths for hosts to access information managed by the storage server using block access operations. Controller OS 1000 can be thought of as including both hardware interface logic represented by access logic 1010, and virtual organization management logic represented by association logic 1050.

Access logic 1010 provides drivers and protocols to interface with hardware devices such as storage devices and host devices. In operation, a host forwards a request as a packet over a network connection to the storage server, which receives the request via a network adapter. A network driver such as media access layer 1040 processes the request and, if appropriate, passes it to a protocol stack layer 1030 for additional processing prior to forwarding to management layer 1020. Management layer 1020 maps logical identifiers to appropriate data blocks in storage for storage addresses indicated in the request. In one embodiment, management layer 1020 checks memory for a data block, and then accesses a storage device if a requested data block is not found in memory.

Access logic 1010 includes media access layer 1040, which can include any one or more interface technologies to access hardware interconnections. Access logic 1010 includes one or more protocol stacks 1030. Protocol stacks 1030 and/or media access layer 1040 can include drivers to access hardware interconnection devices.

Controller OS 1000 can provide a path to perform data storage access via hardware, software, and/or firmware. Access logic 1010 can be implemented as layers of software. At least portions of access logic 1010 can be alternatively implemented as hardware. A hardware storage access request data path can be implemented as logic circuitry embodied within a field programmable gate array (FPGA) or an application specific integrated circuit (ASIC). A hardware path can increase the performance of the storage service provided by the storage server in response to a request received from a host. In one embodiment, the processing elements of the network adapter and/or the storage adapter (e.g., adapters 920, 930 of FIG. 9) can be configured to offload some or all of the packet processing and storage access operations, respectively, from processor 902, to increase the performance of the storage service provided by the storage server. It is expressly contemplated that the various processes, architectures, and procedures described herein can be implemented in hardware, firmware or software.

Association logic 1050 represents a logical view of the organization of the data blocks. Association logic 1050 illustrates the organization of data blocks 1080 into one or more volumes 1060. While only one volume is explicitly shown, it will be understood that multiple volumes can be created within controller OS 1000. Each volume 1060 can include one or more logical sections 1070, which can be any logical grouping of blocks under the volume level, in an embodiment where multiple logical elements can be used. Each volume 1060 and logical section 1070 include multiple blocks 1080. Association logic 1050 represents associations of blocks 1080 as defined and managed by management layer 1020.

In one embodiment, a storage operating system 1000 includes a series of software layers organized to form a storage server that provides data paths for accessing information stored on storage devices. Information can include data received from a host, in addition to data accessed by the storage operating system in support of storage server operations such as program application data or other system data. In one embodiment, data is organized as one or more logical storage objects (e.g., volumes) that define a logical arrangement of data from one or multiple storage devices. In one embodiment, the logical arrangement can involve logical unit numbers for blocks, and/or other arrangements of blocks and storage address space.

In one embodiment, controller OS 1000 includes one or more host write capture proxies 1090, which manage I/O access to uninitialized storage space. Host write capture proxy 1090 can be thought of as a proxy or alternatively as a framework for host write capture services. In one embodiment, host write capture proxy 1090 is implemented on existing functional components of a storage system in which controller OS 1000 executes. In one embodiment, proxy 1090 includes a repository interface (not shown), which enables host write capture proxy 1090 to access a storage device or section of storage managed by host write capture proxy 1090.

As used herein, the term "storage operating system" generally refers to the computer-executable code operable on a computer to perform a storage function that manages data access and can implement data access semantics of a general purpose operating system. The storage operating system can also be implemented as a microkernel, an application program operating over a general-purpose operating system, or as a general-purpose operating system with configurable functionality, which is configured for storage applications as described herein.

As used herein, instantiation refers to creating an instance or a copy of a source object or source code. The source code can be a class, model, or template, and the instance is a copy that includes at least some overlap of a set of attributes, which can have different configuration or settings than the source. Additionally, modification of an instance can occur independent of modification of the source.

Flow diagrams as illustrated herein provide examples of sequences of various process actions. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various operations or functions are described herein, which can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communications interface to send data via the communications interface. A machine readable medium or computer readable medium can cause a machine to perform the functions or operations described, and includes any mechanism that provides (i.e., stores and/or transmits) information in a form accessible by a machine (e.g., computing device, electronic system, or other device), such as via recordable/non-recordable storage media (e.g., read only memory (ROM), random access memory (RAM), magnetic disk storage media, optical storage media, flash memory devices, or other storage media) or via transmission media (e.g., optical, digital, electrical, acoustic signals or other propagated signal). A communication interface includes any mechanism that interfaces to any of a hardwired, wireless, optical, or other medium to communicate to another device, such as a memory bus interface, a processor bus interface, an Internet connection, a disk controller. The communication interface can be configured by providing configuration parameters and/or sending signals to prepare the communication interface to provide a data signal describing the software content.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations without departing from their scope. Therefore, the illustrations and examples herein should be construed in an illustrative, and not a restrictive sense.

What is claimed is:

1. A method comprising:
   receiving an I/O (input/output) access request by a proxy layer of an I/O processing stack in a storage server of a storage system having initialized storage space and uninitialized storage space;
   storing host write information for a write I/O access request in a host write metadata repository managed by the proxy layer;

determining if an address of the write I/O access request corresponds to an initialized storage region of the storage system or an uninitialized storage region of the storage system; and when the address corresponds to an uninitialized storage region, performing an on-demand initialization of the storage region, and performing a write of the write I/O access request based on region information provided by the proxy layer.

2. The method of claim 1, wherein the host write metadata repository comprises a delta log.

3. The method of claim 1, wherein receiving the I/O access request further comprises determining if the I/O access request is a read I/O access request or a write I/O access request.

4. The method of claim 3, wherein in response to determining that the I/O access request is a read I/O access request, determining if an address of the read I/O request corresponds to an initialized storage region of the storage system or an uninitialized storage region of the storage system, wherein when the address corresponds to an uninitialized storage region, returning zeroed data from the proxy layer without accessing the uninitialized storage region.

5. The method of claim 1, wherein the uninitialized storage region is uninitialized due to execution of a background parity generation process.

6. The method of claim 5, further comprising determining that execution of the background process has reached a threshold execution point; and disabling the proxy layer in response to determining that the background process has completed execution.

7. The method of claim 1, further comprising determining that the proxy layer has initialized a threshold amount of a volume, and triggering start of a background initialization process in response to determining that the threshold amount of the volume has been reached.

8. The method of claim 1, wherein the background process includes a feature for synchronizing data over a network link, and further comprising:
determining whether host write metadata exists for a data block; and
copying a data block over the network link when host write metadata exists for the data block; and
not copying a data block over the network link when no host write metadata exists for the data block.

9. The method of claim 1, wherein initializing the storage region when the address corresponds to an uninitialized storage region comprises writing zeroes to the storage region prior to committing a write to disk.

10. The method of claim 1, wherein initializing the storage region when the address corresponds to an uninitialized storage region comprises writing the write I/O access request to cache and filling out the storage region associated with the write I/O access request with zeroes.

11. The method of claim 10, wherein for a subsequent write I/O access request to the same storage region, writing the subsequent write I/O access request to the cache, overwriting the zeroes.

12. A non-transitory machine readable medium having stored thereon instructions for performing a method comprising machine executable code which when executed by at least one machine, causes the machine to:
receive an I/O (input/output) access request by a proxy layer of an I/O processing stack having initialized storage space and uninitialized storage space;
store host write information for a write I/O access request in a host write metadata repository managed by the proxy layer; determining if an address of the write I/O access request corresponds to an initialized storage region or an uninitialized storage region;

when the address corresponds to an initialized storage region, perform a write of the write I/O access request to the initialized storage region based on region information in the write I/O access request; and when the address corresponds to an uninitialized storage region, perform an on-demand initialization of the uninitialized storage region, and perform a write of the write I/O access request based on region information provided by the proxy layer.

13. The non-transitory machine readable medium of claim 12 having further machine executable code that causes the machine to:
determine if the I/O access request is a read I/O access request or a write I/O access request; and
in response to determining that the I/O access request is a read I/O access request;
determine if an address of the read I/O request corresponds to an initialized storage region or an uninitialized storage region;
when the address corresponds to an initialized storage region, perform a read of the initialized storage region based on the read I/O request; and
when the address corresponds to an uninitialized storage region, return zeroed data from the proxy layer without accessing the uninitialized storage region.

14. The non-transitory machine readable medium of claim 12 having further machine executable code that causes the machine to:
move only user data for execution of a background process, including one of a disk reconstruction process, volume copy, or an asynchronous remote volume mirroring process.

15. The non-transitory machine readable medium of claim 12 having further machine executable code that causes the machine to:
determine that the proxy layer has initialized a threshold amount of a volume, and triggering start of a background initialization process in response to determining that the threshold amount of the volume has been reached.

16. A computing device comprising:
a memory containing machine readable medium comprising machine executable code having stored thereon instructions for performing a method of accessing data in a storage system;
a processor coupled to the memory, the processor configured to execute the machine executable code to cause the processor to:
store write information for a write I/O access request in a metadata repository; and
determine if an address of the write I/O access request corresponds to an initialized storage region of the storage system or an uninitialized storage region of the storage system,
wherein when the address corresponds to the uninitialized storage region, a write capture proxy of an I/O (input/output) transaction processing stack performs an on-demand initialization of the uninitialized storage region and a write of the write I/O access request based on region information for the write I/O access request.

17. The computing device of claim 16, wherein the write capture proxy further determines if an I/O access request is a read I/O access request.

18. The computing device of claim 17, wherein in response to determining that the I/O access request is the read I/O access request, the write capture proxy determines if an address of the read I/O request corresponds to the initialized storage region of the storage system or the uninitialized storage region of the storage system, wherein when the address corresponds to the uninitialized storage region, the write capture proxy returns zeroed data without accessing the uninitialized storage region.

19. The computing device of claim 16, wherein the uninitialized storage region is uninitialized due to execution of a background process, including one of a disk reconstruction process, a background parity generation process, or an asynchronous remote volume mirroring process.

20. The computing device of claim 19, wherein the write capture proxy determines that it has initialized a threshold amount of a volume, and in response to determining that the threshold amount of the volume has been reached, triggering a start of a background initialization process.

\* \* \* \* \*